INVENTOR.
HERMAN G. KRAUT
BY
ATTORNEY

United States Patent Office 3,289,384
Patented Dec. 6, 1966

3,289,384
METHOD OF FORMING PACKAGES
Herman G. Kraut, New Britain, Conn., assignor to The Stanley Works, New Britain, Conn., a corporation of Connecticut
Filed Nov. 19, 1963, Ser. No. 324,692
11 Claims. (Cl. 53—22)

The present invention relates to packaging, and, more particularly, to a method and apparatus for packaging articles between a film of synthetic thermoplastic sheet material and a substrate.

In United States Patent Number 3,031,072, granted April 24, 1962, and entitled Package and Method of Forming Same, there is described a package having an article supported on a paperboard substrate and sheathed by a thermoplastic film which is drawn thereabout and bonded to the substrate about the article by its own substance, and the method of making the package. A similar method and article additionally employing an adhesive coating or laminate upon the the substrate or film has been widely employed prior to the invention of the aforementioned patent, which method and article are described in many patents including United States Patent Number 2,855,735, granted October 14, 1958, and United States Patent Number 2,861,405, granted November 25, 1958. This general method of packaging using a sheathing film and a supporting substrate has commonly become known as "skin-packaging."

Packages produced by skin-packaging are subject to dog-earing and curling due to contraction of the plastic film upon cooling thereof following bonding to the substrate and due to the dimensional instability or variation in resistance to tensional forces inherent in some substrate materials such as paperboard and caused by variation in atmospheric conditions such as humidity. Such curling and dog-earing is particularly disadvantageous in packaging for point-of-sale merchandising because it reduces the attractiveness of the package and is pronounced in packages using relatively thin substrate materials.

It is an object of the present invention to provide a method of skin-packaging articles to form a composite package which is substantially resistant to curling.

It is also an object to provide such a method which may be adapted by relatively facile and economical modifications to existing skin-packaging machinery.

Another object is to provide relatively inexpensive means for adapting skin-packaging machinery to the production of attractive and curl-resistant cards.

Other objects and advantages will be readily apparent from the following detailed description and claims and the attached drawings wherein:

Figure 1:
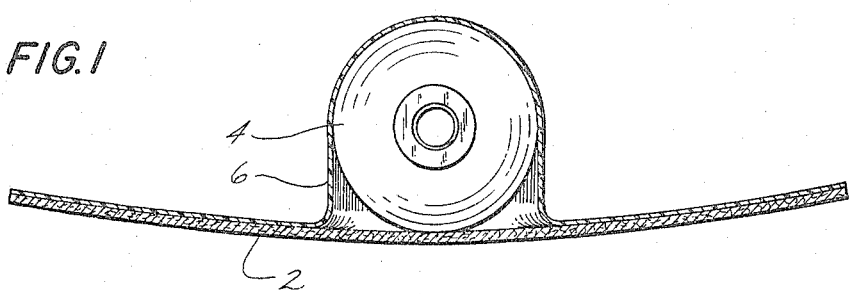
FIGURE 1 is a sectional view of a composite package made by preexisting skin-packaging techniques which has been exposed to an atmosphere of moderate humidity.

It has now been found that the foregoing and related objects can be readily attained in a method of skin-packaging wherein one surface of an air-pervious paperboard substrate is moistened with an aqueous agent and an article to be packaged is placed upon the other surface of the substrate, the moistened surface being disposed downwardly. A length of synthetic thermoplastic film, supported adjacent its margins in a position overlying the article and substrate, is heated until deformable. Suction is drawn through the moistened surface of the substrate while the heated film is supported in a position closely overlying the substrate and article to draw the film into a sheath about the article and into laminar contact and bonding engagement with the surface of the substrate about the article to form a composite package. Sufficient moisture is removed from the moistened surface of the substrate to provide compensating stresses therein and substantially eliminate curling of the package over extended periods of storage under varying atmospheric conditions.

A substantial portion and usually a sufficient portion of the excess moisture in the moistened lower surface of the substrate will be removed within the skin-packaging apparatus under normal conditions of operation by action of the environmental heat and the vacuum. This removal can be ensured by a period of post-heating in the skin-packaging apparatus subsequent to bonding of the film to the paperboard such as is sometimes employed for developing optimum appearance in the film. In any event, sufficient moisture should be removed from the fibers during the skin-packaging cycle to avoid subsequent fiber slippage upon removal from the apparatus. If so desired, drying apparatus may be employed to complete the excess moisture removal such as a plurality of heat lamps or a drying oven over a conveyor unit at the discharge end of the skin-packaging apparatus.

Although the theory of operation is not completely understood, it is believed that moistening of the lower surface of the paperboard substrate causes the fibers in the lower surface portion to swell and to slip more readily with respect to each other by reducing the papermaking bond therebetween. When suction is applied to the moistened lower surface, the substrate is drawn down tightly against the planar support member, and the cellulosic fibers adjacent the supporting surface first slip and reorient and then are pressed into a mat because of the pressures being exerted by the vacuum when the substrate is rendered impervious by bonding of the film thereto. The vacuum and environmental heat remove the excess moisture permitting the relative slippage of the fibers after at least some measure of reorientation of the fibers occurs. The shrinkage then produced in the previously moistened surface portion by the further removal of the moisture from the reorientated fibers then appears to cooperate with the apparent fiber reorientation to result in prestressing of the previously moistened surface portion, thus causing the paperboard substrate to tend to bow in the direction of the moistened lower surface. This prestressing is probably caused by shrinkage of the fibers in the moistened surface portion to place this portion in compression in the planar configuration which the substrate assumes in the skin-packaging operation when the excess moisture permitting relative slippage of the fibers is removed as the paper-making bond locks the fibers in their reoriented position. The resultant prestressed condition thus compensates for the stresses upon the opposite surface produced by the film and tolerates considerable variation in the moisture content of the fibers to provide the desired stability of configuration, thus substantially eliminating curling.

Moreover, it has been found that the method of the present invention increases the apparent stiffness and rigidity of the paperboard substrate, presumably due to the compatcing and reorientation of the fibers in this lower surface portion. Thinner substrates thus may be employed for a given package with resultant savings in cost or the increased rigidity may be used to enhance the package characteristics. Generally, a reduction in thickness of about 15 to 30 percent has been found practicable for many applications.

The aqueous agent used for moistening the lower surface of the paperboard substrate may be water per se for most applications or it may be an aqueous solution or dispersion of various materials which may assist in obtaining optimum properties in the paperboard substrate and particularly in reducing the tendency of the paperboard fibers to absorb moisture. Generally, water per se is sufficient for most applications, but the addition of a moistureproofing agent may be desirable to guard against extremely humid atmospheres which would tend to overcome the apparent prestressing of the fibers developed by the present invention. The preferred additives to form an aqueous agent are so-called waterproofing agents which may be either inorganic or organic compounds. The compounds may act as a sizing agent to reduce the ability of the paperboard to take up moisture after the moisture of the aqueous agent has beeen removed, but they should not interfere with the drawing of a vacuum therethrough, particularly when the process of applicant's aforementioned United States Patent Number 3,031,072 is employed. However, other compounds functioning to preferentially absorb the moisture penetrating the portion of the sheath or serving to decrease the porosity of the lower surface of the sheet after the vacuum has been drawn therethrough and the moisture of the aqueous agent removed may also be employed as long as they do not interfere with the skin-packaging operation.

Generally, an aqueous solution of water glass in the amount of 3 to 10 percent by volume may be employed as may be aqueous solutions or dispersions of various synthetic resins or organic compounds which tend to coat the fibers. As a specific example of a satisfactory organic formulation has been a Werner-type chromium complex in isopropanol (sold under the tradename Quilon by E. I. du Pont de Nemours) admixed with hexamethylenetetramine. One part Quilon (30 percent solution) is admixed with nineteen parts water and with 0.05 part hexamethylenetetramine.

Although the method of the present invention may be utilized with adhesive coatings or laminates upon the substrate or film, the method of applicants' aforementioned United States Patent Number 3,031,072 is preferably utilized for optimum economy and most facile operation.

Although perforated, relatively low porosity paperboard materials may be employed for the air-pervious substrate where adhesive coatings or laminates are employed to effect bonding, the preferred and ideal substrates are porous paperboard sheet materials which will permit the drawing of a vacuum therethrough and which preferably are free from an adhesive coating. Most desirably, the paperboard is only lightly calendered to preserve the inherently porous, gas-permeable nature throughout which provides optimum bonding throughout the area of laminar contact with the film. A suitable paperboard stock, for example, is the type known in the trade as "patent coated" which has a face or top layer composed essentially of virgin pulp and high-grade waste free of ground wood and presenting an attractive finish and appearance. In the event a colored background or base color is to be used to provide an attractive appearance, it is most desirable to select a paperboard sheet material which has been vat dyed with the desired color during its manufacture to eliminate the necessity for printing the background color upon the paperboard.

When the bonding of the film to the paperboard is by the substance of the film itself as set forth in applicant's aforementioned patent, care should be taken to select printing inks for the paperboard which will not unduly interfere with the bonding process since certain inks contain sufficiently high quantities of binders or fillers to interfere with the porosity of the paperboard stock or to otherwise interfere with the bonding operations. Similarly, when the bonding of the film is by the substance of the film itself, the substrate should be substantially imperforate in the area of laminar contact to achieve optimum uniformly of bonding throughout the area of laminar contact. However, incidental perforations may also be incorporated for purposes of hanging the packages, or for tearing the substrate by the user to open the package, or about the article to permit more rapid draw of the film about the article into a sheath as may be desirable when the article is large and requires a large degree of draw. Where an adhesive coating or laminate is employed to effect the bond, the substrate may be non-porous and the area of surface contact may contain perforations as are often utilized to permit drawing a vacuum therethrough. In either instance, the substrate should be of sufficient rigidity for the packaging application.

Although the above method may be desirably employed with films having an adhesive coating or laminate, the most desirable films employed are polyolefins having at least their lower surface at least partially oxidized or surface-treated to render the lower surface more susceptible to activation by heat than the body of the film as disclosed and claimed in applicant's aforementioned United States Patent Number 3,031,072. Generally, such films may have their surface oxidized during the process of extrusion, electrostatically, chemically or flame-treated, or otherwise treated to provide the desired surface characteristics.

The films used for the present invention may be of a thickness of about 2 to 11 mils, and preferably about 3 to 7 mils, depending upon the degree of distention or draw required to form the sheath about the article and the weight of the article. Heavier gauge films may be employed albeit with greater cost and longer periods of heating to achieve the desired deformability. The preferred films are surface-treated polyolefins as described in applicant's aforementioned patent, and particularly, surface-treated polyethylene films of about 3 to 7 mils in thickness.

The suction applied to the bottom or moistened surface of the substrate should be sufficient to distend the film into a tight-fitting sheath about the articles and to draw the film into tight surface contact and bonding engagement with the substrate, as well as to achieve the desired fiber orientation and probable mat formation in the moistened lower portion of the substrate adjacent the bottom surface. Generally, the suction applied will be continued for a period of time after the film has been brought into bonding engagement with the upper surface of the substrate to assist in evacuating the excess moisture from this bottom portion and to provide the probable fiber orientation and mat formation therein. In the instance of the method of the aforementioned United States Patent Number 3,031,072, the suction should be sufficient to draw the surface of the film into the pores of the paperboard.

In a commercial embodiment of apparatus found suitable for practicing the present invention, suction rated at about 23 inches of mercury (about 11.5 pounds per square inch) has proven highly satisfactory. The actual amount of suction required will vary with the permeability or porosity and the conditions of operation. Generally, the suction is applied for a period of about two to twenty seconds to bring the film and substrate into laminar engagement with a relatively short additional interval being required to ensure the desired fiber orientation and withdrawal of excess moisture from the bottom surface portion. A total period for the vacuum cycle of about three to twelve seconds is satisfactory for most operations with the period following bonding of the substrate and film being about two to six seconds.

As will be readily appreciated, the substrate should be supported on a substantially planar surface to achieve optimum operation. Generally, the skin-packaging apparatus employs a support member or platform member having a planar upper surface portion and having channels or conduits therein for applying suction to the bottom surface of the paperboard. This planar surface ensures the probable prestressing of the fibers in the planar form so as to resist subsequent curling not only in moist atmospheres but also in dry atmospheres which would tend to withdraw moisture from the fibers of the paperboard substrate.

The amount of water applied to the bottom surface of the substrate should be sufficient to permit the desired fiber reorientation and subsequent shrinkage to achieve the curling resistance of the present invention. The amount will vary with the paperboard sheet material in the range of about 30 to 65 percent by weight of the lower surface portion, but should not be excessive so as to injure the printing or properties of the paperboard substrate or to produce moisture interference with the bonding of the film to the upper surface. Generally, the application of the aqueous agent by roll coating with a roller having a relatively porous surface rotatably supporter in a tank containing aqueous agent has been advantageously employed in production facilities.

The amount of water extracted from the lower surface of the sheet during and subsequent to the bonding of the film thereto should be sufficient to develop the desired pretensioning of the lower surface of the substrate. Generally, this requires removing the excess moisture introduced prior to placement within the skin-packaging apparatus to return to a total moisture content of about 5 to 10 percent by weight. The exact amount of drying may be easily observed by touching the substrate and by observing the composite packages.

Referring now in detail to the attached drawings, FIGURE 1 is illustrative of the pronounced curling occurring in a composite package produced under conventional practice when exposed to normal or above-normal humidity. As will be readily appreciated, the humidity of the atmosphere may vary widely with location and the time of year, thus raising a varying problem since the amount of curl will be dependent upon the humidity and upon the tendency of the thermoplastic film to contract, as well as the area of thermoplastic film involved. The package is comprised of a patent-coated paperboard substrate 2, an article 4 placed upon the upper surface of the substrate 2 and a cover of synthetic thermoplastic film forming a sheath about the article 4 and bonded to the upper surface of the substrate 2 from adjacent the periphery of the article to the margins of the substrate. During storage in relatively humid atmospheres, the fibers in the lower surface portion of the substrate tend to absorb moisture and swell. Simultaneously, the film 6 has a degree of tensional stresses therein produced by shrinkage upon cooling following its bonding to the substrate and is resistant to any expansion of area. The film thus not only tends to restrain expansion of the upper surface of the substrate 2 by reason of its bond thereto but also to develop compressional stresses therein. Apparently the compresional stresses developed in the upper surface portion of the substrate cause the moistened fibers of the bottom surface portion to be extended and to curl in the direction of the relatively dimensionally stable upper surface as shown in FIGURE 1. This same tendency for curling may also be developed without change in humidity by reason of high tensional stresses developed by the shrinkage film.

Figure 2:
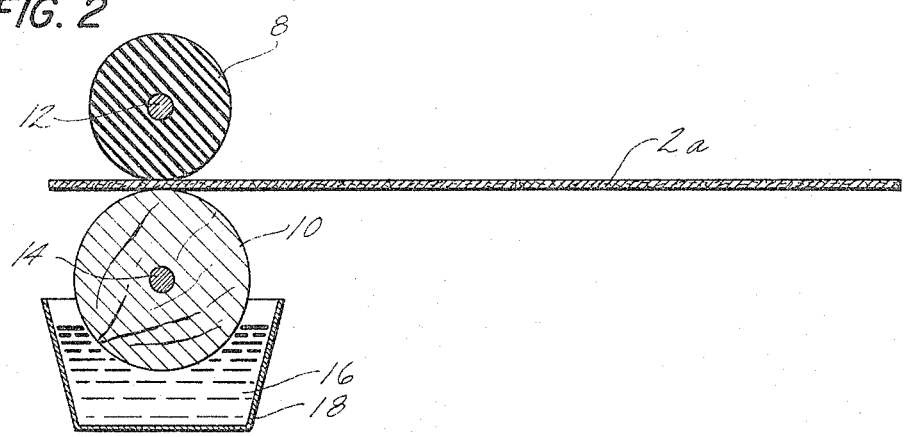
FIGURE 2 is a sectional view of apparatus for moistening a paperboard substrate.

Turning now to FIGURE 2, therein is illustrated apparatus for moistening one surface of a paperboard substrate 2a in accordance with the present invention. The paperboard substrate 2a is passed into the nip between an upper roller 8 and a lower roller 10 which are mounted for rotation upon shafts 12, 14, respectively. Roller 10 is partially submerged in an aqueous agent 16 contained in the pan or reservoir 18. As the substrate 2a passes between rollers 8 and 10, the lower roller 10 rotates and carries upon its surface water from the reservoir 18 to the lower surface of the substrate 2a. By predetermining the amount of aqueous agent carried by the surface of roller 10 and the pressure which the roller 8 exerts upon the roller 10 through the substrate 2a, the amount of aqueous agent deposited on the lower surface of the substrate 2a can be readily controlled. The rollers 8, 10 may be driven frictionally by passage of the substrate 2a therebetween or by auxiliary drive means (not shown).

Figure 3:
FIGURE 3 is a side elevational view of a paperboard substrate which has dried after moistening in the apparatus of FIGURE 2.

Referring now to FIGURE 3, the substrate 2a which has been wetted in accordance with FIGURE 2 evidences pronounced curling in the direction of the lower or moistened surface after it has been subjected to the operating conditions of the skin-packaging apparatus but without film having been bonded thereto. Apparent fiber reorientation adjacent the moistened lower surface produced by the operating conditions and/or the shrinkage of the fibers in the moistened portion upon removal of the excess moisture produce compressional stresses in the lower surface portion so as to produce curling in the direction of the moistened surface.

Figure 4:
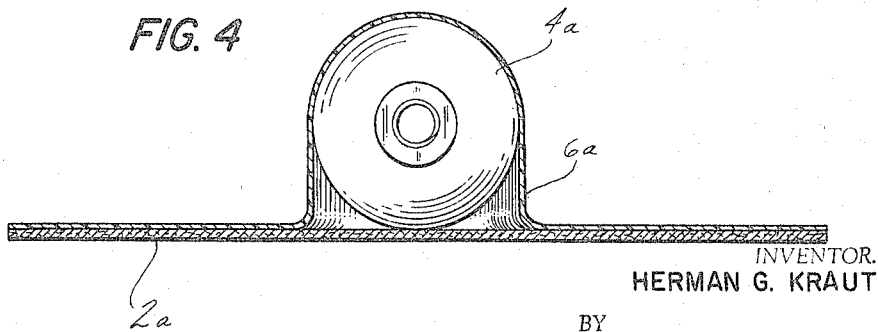
FIGURE 4 is a sectional view of a composite package produced in accordance with the present invention.

In FIGURE 4, a composite package produced in accordance with the present invention is illustrated as being substantially free from curling after storage for extended periods of time at relatively high atmospheric humidity. The substrate 2a has been moistened in accordance with FIGURE 2 and has had an article 4a placed upon the upper surface thereof. A thermoplastic film 6a has been formed into a sheath thereabout and brought into laminar contact and bonding engagement with the upper surface of the substrate from the periphery of the article to the margins thereof. The tension produced by the pronounced tendency of the film to shrink upon cooling is now compensated by the pretensioning of the fibers in the lower surface portion produced by fiber reorientation and/or shrinkage during the process of manufacturing the composite package. Because of the relatively high degree of compressive prestressing of this lower surface portion, the illustrated package is able to fully resist the tensionable pressures of the shrinking film, as well as considerable deviation in atmospheric humidity both in terms of relative dryness and relatively high humidity.

Illustrative of the efficacy of the present invention are following specific examples.

EXAMPLE ONE

A patent-coated paperboard substrate of about 0.032 inch in thickness was moistened upon its lower surface by a redwood roller rotating through a reservoir of water. The substrate was placed upon an air-pervious support tray member having a planar upper surface and sets of wrenches were placed thereon in predetermined position in accordance with patterns printed upon the upper surface of the substrate. The sets of wrenches were approximately 1½ inchs high, 7 inches long and up to 1½ inches in width. A surface-treated polyolefin of about 5 mils thickness was supported in a position overlying the substrate and articles and heated to deformability by a Calrod-type heater. The air-pervious support member was moved into a position wherein the deformably heated film was closely overlying the substrate and articles as suction was being drawn through the support member and thereby through the substrate. The suction drew the film into a close-fitting sheath about the socket wrenches and into laminar contact with the upper surface of the paperboard substrate from adjacent the periphery thereof to the margins of the substrate. The film was bonded to the substrate by its own substance and without the use of additional adhesives in accordance with applicant's aforementioned patent. The heating cycle extended for a total period of nine seconds with the film preheating portion thereof being about four seconds' duration and with the portion of the cycle during which the film and substrate were being drawn into contact and in laminar contact being about five seconds. The suction was applied to the bottom of the substrate during this entire five-second period. No additional heating outside of the apparatus was employed, sufficient of the moisture being extracted by the heat and vacuum in this packaging cycle.

The composite packages thus formed have been exposed to atmospheres of varying humidity without evidence of any appreciable curling.

EXAMPLE TWO

Samples of composites of surface-treated polyethylene film and patent-coated paperboard were prepared in conventional skin-packaging apparatus under identical conditions of operation but omitting articles to be encased therein. An extended vacuum and heating period of about three seconds following bonding of the film was employed for all samples to remove the excess moisture and stress the bottom of the substrate in those samples treated with an aqueous agent. One set of samples employed an untreated substrate. A second set of samples employed a similar substrate moistened with water, and a third set employed a substrate which had been moistened with an aqueous solution of Quilon and hexamethylenetetramine, both of these sets being in accordance with the present invention.

A group of specimens comprising a sample of each set was exposed to atmospheric relative humidity of about 60 to 65 percent for twenty-four hours. Upon inspection, the sample with the untreated substrate was found to have a noticeable curl whereas the samples produced in accordance with the present invention evidenced no noticeable curl.

A second group of specimens was exposed to an atmospheric humidity of about 85 to 90 percent for six hours. The untreated substrate curled almost into a cylinder whereas the substrates treated in accordance with the present invention exhibited but slight evidence of curling.

Although the disclosure of the present application is primarily directed to developing an attractive composite packaging having a substantially planar substrate, the principles of the present invention also are applicable to non-planar or molded substrates as disclosed and claimed in applicant's copending application Serial Number 324,684, filed November 19, 1963, and entitled Method of Packaging and Package Produced Thereby.

Thus, it can be seen from the foregoing detailed specification and drawings that the present invention provides a novel and highly effective method for skin-packaging articles to form a composite package which is substantially resistant to curling under varying atmospheric conditions. The method may be adapted to existing skin-packaging machinery by relatively facile and economical modifications to produce a relatively inexpensive composite package. The increased rigidity obtained by the present invention may be advantageous in further reducing costs of the substrates or can be used for enhanced strength in the composite packages per se.

Having thus described the invention, I claim:

1. In the method of skin-packaging articles between a substrate and a thermopastic film to form a composite package, the steps comprising: moistening one surface of an air-pervious paperboard substrate with an aqueous agent; placing an article to be packaged upon the outer surface of said substrate, said moistened surface being disposed downwardly; supporting a length of synthetic thermoplastic film adjacent the margins thereof in a position overlying said substrate and article; heating said thermoplastic film to deformability; drawing suction through said substrate while supporting the deformably heated film in a position closely overlying said substrate and article to draw said film into a sheath about said article and into laminar contact and bonding engagement with said other surface of said substrate about said article to form a composite package; and removing sufficient moisture from said one surface of said substrate to produce compensating stresses therealong and substantially eliminate curling of the package under varying atmospheric conditions.

2. The method of claim 1 wherein said substrate is a porous paperboard and said film is a polyolefin having its lower side surface-treated and wherein said film is bonded to said substrate by its own substance without the use of adhesives and with a portion of the lower surface thereof extending into the pores of the paperboard substrate.

3. The method of claim 2 wherein said polyolefin is polyethylene and said film is about 2 to 11 mils in thickness.

4. The method of claim 1 wherein said aqueous agent is water.

5. The method of claim 1 wherein said aqueous agent is an aqueous solution of sodium silicate.

6. The method of claim 1 wherein said aqueous agent is selected from the group consisting of aqueous solutions and dispersions of synthetic resins for imparting to the fibers of said paperboard substrate resistance to penetration by moisture.

7. The method of claim 1 wherein said substrate is supported upon an air-pervious support member providing a substantially planar surface and wherein said suction is drawn through said support member and thence through said substrate.

8. The method of claim 1 wherein said removal of sufficient moisture is effected substantially by the heat and vacuum of the preceding steps.

9. In the method of skin-packaging articles between a substrate and a thermoplastic film to form a composite package, the steps comprising: moistening one surface of a porous paperboard substrate with an aqueous agent; placing said moistened substrate upon an air-pervious support member having a substantially planar upper surface against which said moistened surface is placed; placing an article to be packaged upon the upper surface of said substrate; supporting a length of polyolefin film adjacent the margins thereof in a position overlying said substrate and article, said film having a surface-treated lower surface; heating said polyolefin film to deformability and to activate the treated surface while maintaining substantially the integrity of the body of the film; drawing suction through said support member and thence through said substrate while supporting the deformably heated and activated film in a position closely overlying said substrate and article to draw said film downwardly about said article into a close-fitting sheath and into laminar contact with said substrate surrounding said article to form a composite package wherein said film is bonded by its own substance to said substrate upon being drawn into laminar contact with portions of the lower surface thereof extending into the pores of the substrate; and removing sufficient moisture from said moistened surface of said substrate to produce compensating stresses therealong and substantially eliminate curling of the composite package under varying atmospheric conditions.

10. The method of claim 9 wherein said polyolefin is polyethylene and said film is about 2 to 11 mils in thickness.

11. The method of claim 10 wherein said removal of sufficient moisture is effected substantially by the heat and vacuum of the preceding steps.

References Cited by the Examiner

UNITED STATES PATENTS

| | | | |
|---|---|---|---|
| 2,855,735 | 10/1958 | Groth | 53—22 |
| 2,861,405 | 11/1958 | Hanford | 53—22 |
| 2,937,746 | 5/1960 | Ferguson | 206—78 |
| 2,950,004 | 8/1960 | Acomb | 206—78 |

TRAVIS S. McGEHEE, *Primary Examiner.*

GEORGE O. RALSTON, *Examiner.*

L. G. MANCENE, *Assistant Examiner.*